(12) United States Patent
Alexander

(10) Patent No.: US 7,339,808 B2
(45) Date of Patent: Mar. 4, 2008

(54) METHOD AND APPARATUS FOR DC TO AC POWER GENERATOR

(76) Inventor: Robert W. Alexander, deceased, late of Yucaipa, CA (US); by Josette M. Alexander, legal representative, 33964 Avenue I, Yucaipa, CA (US) 92339-2313

( * ) Notice: Subject to any disclaimer, the term of this patent is extended or adjusted under 35 U.S.C. 154(b) by 84 days.

(21) Appl. No.: 11/325,561

(22) Filed: Jan. 5, 2006

(65) Prior Publication Data

US 2007/0153558 A1    Jul. 5, 2007

(51) Int. Cl.
*H02M 7/44* (2006.01)
(52) U.S. Cl. ............................................. 363/95
(58) Field of Classification Search .................. 363/95, 363/97, 131; 323/255, 340
See application file for complete search history.

(56) References Cited

U.S. PATENT DOCUMENTS

| | | | |
|---|---|---|---|
| 3,081,426 A * | 3/1963 | Bakke | ......................... 323/255 |
| 3,663,941 A | 5/1972 | Pasciutti | |
| 3,825,816 A | 7/1974 | Togneri et al. | |
| 3,946,301 A | 3/1976 | Love | |
| 4,067,057 A | 1/1978 | Taddeo et al. | |
| 4,131,937 A | 12/1978 | Pelly et al. | |
| 4,186,434 A | 1/1980 | Cowett | |
| 4,453,207 A | 6/1984 | Paul | |
| 4,471,422 A | 9/1984 | Hierholzer | |
| 4,480,300 A | 10/1984 | Luursema | |
| 4,528,457 A | 7/1985 | Keefe et al. | |
| 4,556,937 A | 12/1985 | Ziogas et al. | |
| 4,706,177 A | 11/1987 | Josephson | |
| 4,843,534 A | 6/1989 | Taddeo et al. | |
| 4,872,100 A | 10/1989 | Diaz | |
| 5,313,143 A | 5/1994 | Vila-Masot et al. | |
| 5,361,196 A | 11/1994 | Tanamachi et al. | |
| 5,452,197 A | 9/1995 | Rice | |

(Continued)

FOREIGN PATENT DOCUMENTS

JP    4091663    3/1992

OTHER PUBLICATIONS http://theepicenter.com/dc_to_ac_power_converters_and_interters.html retrieved: Feb. 2005.

(Continued)

*Primary Examiner*—Adolf Berhane
(74) *Attorney, Agent, or Firm*—Richard C. Litman

(57) ABSTRACT

The dc to ac power generator has a DC power source which is connected at one pole to the primary of a conventional voltage transformer, and at its other pole to a relay controlled switching system. A mechanical switch of the relay is connected to the opposite pole of the transformer primary and it also responds to the presence of voltage on the secondary windings of the transformer, i.e., when the relay is energized. Due to inherent time delays introduced by a combination of the transformer circuitry and the relay energizing circuitry, the relay switching system functions at precise and equal time intervals to reverse polarity of the DC power source with respect to the coils of the transformer, such that output power signals provided at the secondary of the transformer define a precise square wave configuration with waves of equal time duration and approximately equal and opposite magnitudes.

19 Claims, 4 Drawing Sheets

U.S. PATENT DOCUMENTS

| | | | | |
|---|---|---|---|---|
| 5,461,264 | A | * | 10/1995 | Yang .......................... 307/81 |
| 5,737,163 | A | | 4/1998 | Newlin |
| 5,774,351 | A | | 6/1998 | Hsieh et al. |
| 5,962,985 | A | | 10/1999 | Buij et al. |
| 6,023,109 | A | * | 2/2000 | Yang .......................... 307/81 |
| 6,157,529 | A | * | 12/2000 | Ahuja ........................ 361/111 |
| 6,519,168 | B2 | | 2/2003 | Jain et al. |
| 6,798,676 | B2 | | 9/2004 | Chen et al. |
| 2004/0174724 | A1 | | 9/2004 | Mitev et al. |

OTHER PUBLICATIONS

Car-Adapter-165 165 Watt Car Adapter Inverter, Laptops for Less, http://store.1-f-1.com/cgi-bin/cp-app.cgi?pg=prod&ref=CAR-ADAPTER-165 retrieved: Feb. 2005.

* cited by examiner

METHOD AND APPARATUS FOR DC TO AC POWER GENERATOR

BACKGROUND OF THE INVENTION

1. Field of the Invention

The present invention relates to power generation equipment, and more specifically to dc to ac power inversion circuitry.

2. Description of the Related Art

Because of its versatility in numerous situations, alternating current (AC) power has for many years been the primary type of power utilized in operating electrical equipment. Such power is generally produced by means of generators which are in turn powered by fossil fuels, hydroelectric, and the like sources. Many AC electrical power needs are met by the utility company output provided by the aforementioned generators.

However, AC power may also be produced from a direct current (DC) source by voltage, phase and frequency conversion which is most generally accomplished by use of transformers and/or motor-generators. DC power is most commonly utilized as a source for AC power in situations where it is not possible or feasible to interconnect the AC load to a conventional source of AC power, such as an AC power outlet located remote from the area of service by an electric utility.

For example, it would be desirable to have the capability to operate computer equipment, radio equipment, and the like in a mobile environment away from the utility mains and without the need to lug around cumbersome plug-in DC power adaptor cords. Additionally, with the ever increasing popularity of electric and hybrid-electric powered cars, there exists a burgeoning need to have alternative ways of producing AC power from a DC source.

In known systems, conversion of DC power to AC has traditionally required rotating devices including such things as rotors, bearings, stators, armatures, commutators, slip rings, brushes, shafts, and the like. These systems are far too bulky to incorporate in today's modern and light weight electrical vehicles.

Over the past 3 decades, the aforementioned rotating power conversion equipment has been supplanted by solid state switching equipment, some even being transformerless. Often these solid state switching schemes for generating AC from DC involve complex circuitry requiring intricate oscillator, heat dissipation, and feedback control designs. The aforementioned complex circuitry increases failure rates. For ordinary civilian usage, the failure rates of such solid state circuitry may be an acceptable risk. However, when power inversion is required under harsh environmental conditions, such as extreme heat, extreme dust, radiological bombardment, and the like, it would be desirable to have and employ a DC to AC power inversion apparatus that would be virtually impervious to the aforementioned harsh environmental conditions.

Moreover, it would be desirable to have a DC to AC power inversion apparatus that could utilize excess AC power to supplement energy received from the DC sources. However, to supplement the DC energy source requires a power conversion of the excess AC power back into DC. Thus it would additionally be desirable to have a DC to AC power inversion apparatus that could efficiently re-convert the excess power to charge supplemental batteries, for example.

With respect to a waveform of a DC to AC power generator, it would be advantageous to provide a square wave form AC signal, as opposed to a sine wave which generally has an RMS value of 0.707 times the wave's peak voltage. For example, Japanese Patent 4-91663, dated March, 1992 describes a control circuit that provides a square wave form oscillator that derives an output signal from the AC mains. It should be noted that AC mains is required to make the aforementioned oscillator function, thus, unlike the present invention, Patent 4-91663 does not address the issue of providing a square wave form AC signal from a DC input signal.

Many applications require a more efficient waveform such as the aforementioned square waveform, wherein the wave travels directly from the maximum positive value to the maximum negative value of the alternating current, while remaining at each maximum value for approximately equal time intervals. While it is possible to achieve the square waveform with solid state electronic inversion circuitry, such circuitry would still be vulnerable to the aforementioned harsh environmental conditions.

Thus, a dc to ac power generator solving the aforementioned problems is desired.

SUMMARY OF THE INVENTION

The dc to ac power generator includes at least one DC power source which is connected at one pole to the primary of a conventional voltage transformer, and at its other pole to a relay controlled switching system. A mechanical switch of the relay is connected to the opposite pole of the transformer primary and it also responds to the presence of voltage on the secondary windings of the transformer, i.e., when the relay is energized.

Due to inherent time delays introduced by a combination of the transformer circuitry and the relay energizing circuitry, the relay switching system functions at precise and equal time intervals to reverse polarity of the DC power source with respect to the coils of the transformer, such that power signals provided on the outputs of the secondary of the transformer define a precise square wave configuration with waves of equal time duration and approximately equal and opposite magnitudes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
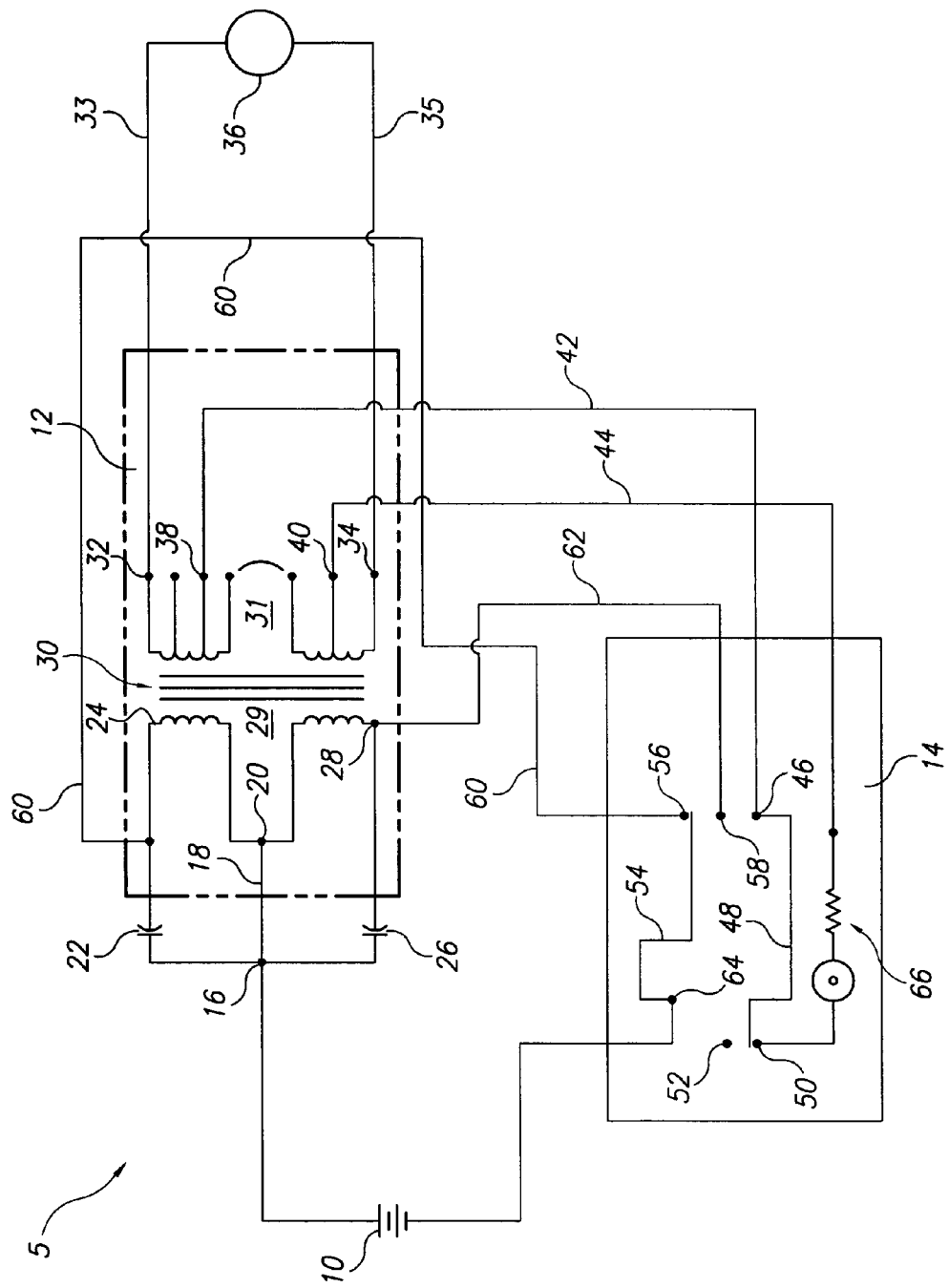
FIG. 1 is an electrical schematic diagram of a first embodiment of the DC TO AC Power Generator, according to the present invention.

The present invention has a DC power source 10 which is connected at one pole to the primary field winding 29 of a conventional voltage transformer 12, and at its other pole to a relay controlled switching system, i.e., a DPDT electromechanical switching relay 14. Although power source 10 is illustrated in FIG. 1 as being comprised of a conventional DC battery, any source of DC power would be useable in the present invention. Additionally, it should be noted that many step down transformers which have been designed to step down the utility mains 120 V to some lower value, e.g. 28 V are adaptable for use in the present invention. Such transformers may have the low voltage side labeled as secondary, and the high voltage side labeled as primary. According to the present invention, and as shown in FIG. 1, such a transformer will be connected in reverse. However, in this document, the side having the lesser number of field windings is designated as the input primary 29 regardless of how the transformer 12 may be labeled. Similarly, the side having the greater number of field windings is designated as the output secondary 31 regardless of how the transformer 12 may be labeled. Thus, a mechanical switch of the relay 14 is connected to the opposite pole of the transformer primary 29 and it also responds to the presence of voltage on the secondary field winding 31 of the transformer 12, i.e., when the relay 14 is energized.

Thus advantageously, and as shown in FIG. 1, the generator 5 is comprised of three components; the direct current (DC) power source 10, the electrical transformer 12, and the DPDT relay switch 14.

Due to inherent time delays introduced by a combination of the transformer circuitry and relay energizing control circuitry 66, the relay switching system 14 functions at precise and equal time intervals to reverse polarity of the DC power source 10 with respect to the coils 29, 31 of the transformer, such that power signals detected on the outputs of the secondary 31 of the transformer 12 define a precise square wave configuration with waves of equal time duration and approximately equal and opposite magnitudes. Moreover, the transformer 12 may be comprised of a conventional full wave, center-tapped transformer, such as a Tarzian/Stancor RT-204, for example. Relay 14 can be comprised of any conventional relay having double pole-double throw (DPDT) switching capability, such as the Babcock BR24D, for example.

More specifically, power source 10 is connected to transformer 12 by electrical connection of its positive end to tie point 16. Tie point 16 is connected via line 18 to a central portion, i.e., center tap 20 of the primary side 29 of transformer 12. Tie point 15 is additionally connected through capacitor 22 to a first end terminal 24 of the primary winding 29 of transformer 12, while the tie point 16 is also connected through capacitor 26 to a second end terminal 28 of the primary side 20 of transformer 12, thereby creating dual LC circuits at the primary 29 of the transformer 14.

A conventional transformer central core 30 extends between the primary 29 and the secondary 31 field windings, i.e., conductive coils, of transformer 12 so that the magnetic field produced by electrical current passing through the transformer field windings 29 and 31 acts in conjunction with the transformer core 30 to produce by induction a voltage transformation between the primary 29 and secondary 31 sides of transformer 12.

In the illustrated embodiment, as shown in FIG. 1, lines 33 and 35 are connected to a first secondary end terminal 32 and a second secondary end terminal 34, respectively of the secondary field winding 31 of transformer 12 so as to transmit power for operation of a load 36. Depending on the magnitude of voltage required for operation, load 36 may be electrically connected via lines 33 and 35 to any available taps on the secondary 31 side of transformer 12. The secondary terminals, such as 32 and 34, which are connected to the load 36, are also referred to herein as output terminals.

Connected to relay energizing taps 38 and 40 on the secondary 31 side of transformer 12 are lines 42 and 44 respectively. Taps 38 and 40 may comprise any of the taps provided on the secondary 31 side of transformer 12, and they are chosen in the preferred embodiment so that the voltage difference measured between them is approximately equal to the nominal voltage rating to energize the relay 14.

As shown in FIG. 1, line 42 connects to a first pivotal reference terminal 46 of a first throw contact blade 48, while line 44 connects through the relay energizing circuit, i.e., relay coil 66 to the normally closed gate terminal 50 associated with the first throw contact blade 48 of relay 14. Lines 42 and 44 could alternatively be reversed and maintain the same functionality, according to the present invention. No connection is made to the normally open gate terminal 52 in either of the aforementioned alternatives.

In addition to the above described connections, the normally closed gate terminal 56 of the second throw contact blade 54 is connected through line 60 to first end terminal 24 of the primary 29 of transformer 12. In like manner, the normally open gate terminal 58 of the second throw contact blade 54 is connected through line 62 to the second end terminal 28 of the primary 29 of transformer 12. Alternatively, line 60 may be connected to terminal 58, and line 62 may be connected to terminal 56, with substantially identical results during system operation. The second pivotal reference terminal 64 of the second throw contact blade 54 is connected to the negative terminal of the DC power source 10 in both of the above alternatives.

In operation, the positive magnitude of the DC voltage from voltage source 10 is applied to the center tap 20 of the secondary 31 of transformer 12. When the second throw contact blade 54 is in the normally closed position so as to contact terminal 56, as illustrated in FIG. 1, a connection is completed from the negative terminal of voltage source 10 through line 60 to the end terminal 24 of the secondary 31 of transformer 12. In this configuration, voltage source 10 is connected across the coil between terminals 20 and 24 such that a voltage corresponding to that of the voltage source 10 appears across the transformer coil between terminals 20 and 24.

The voltage produced on the coil between terminals 20 and 24 generates a magnetic flux which acts in conjunction with transformer core 30 to produce a transformed voltage level on the output terminals 32, 34, 38, and 40 of the secondary 31 side of transformer 12. During system operation, electrical current is passed to the outputs of the secondary 31 of transformer 12 in sufficient quantities to satisfy the power requirements of load 36.

The presence of a voltage differential between terminals 38 and 40 appears at relay energizing coil 66, thus causing first throw contact blade 48 to pivotally move, i.e., rotate, so as to contact the normally open gate terminal 52. Simultaneously, second throw contact blade 54 moves from contact with normally closed gate terminal 56 to contact with the normally open gate terminal 58. In this configuration, voltage source 10 is no longer connected across the coil between terminals 20 and 24, but voltage source becomes connected through line 62 across the coil between terminals 20 and 28.

Thus, the voltage appearing across the coil between terminals 20 and 28 is approximately equal to the magnitude of the voltage from source 10, but having exactly opposite polarity to the voltage which previously appeared across the coil between terminals 20 and 24. In this manner, a voltage of opposite polarity to that previously presented is now transmitted and transformed, i.e., stepped up at the secondary 31 side of transformer 12. The reversing polarity power is then transmitted from terminals 32 and 34 to serve load 36, as previously described.

As the relay coil 66 of switching relay 14 is de-energized when first throw contact blade 48 is in contact with normally open terminal 52, the first throw contact blade 48 begins to rotate until it again contacts the normally closed terminal 50. Simultaneously, second throw contact blade 54 moves from normally open gate terminal 58 back to normally closed gate terminal 56, thus reversing the polarity at the primary 29 once again. Upon contact of the first throw contact blade 48 with gate terminal 50, a potential difference is once again applied to relay energizing coil 66 through relay energizing taps 38 and 40, thus re-energizing the relay to cause the first throw contact blade 48 rotate back to normally open terminal 52. Simultaneously, the voltage polarity across primary 29 reverses itself again due to rotation of second throw contact blade 54. The switching relay 14 provides these voltages of equal and opposite magnitude in an alternate manner having substantially equal time intervals. Thus an AC generator 5 is described.

The frequency of the operation of relay 14 is a function of the magnitude of the voltage energizing the relay coil 66. Since the acceleration of the electro mechanical throw contact blades 48 and 54 can be described as Force÷Mass of the blades, and the Force is proportional to a finite voltage, i.e., electromotive force (EMF) applied to the energizing coil 66, a finite operate/release time in the throw contact blades 48 and 54 is created.

For example, utilizing a nominal 28 volt activation applied to the energizing coil 66, a Babcock relay BR24D relay has an Operate/Release time of 7 ms. The reciprocal of 7 ms yields a nominal operating frequency of approximately 142 HZ. It should be readily understood that the operating frequency can be adjusted by lowering or raising the energizing voltage at relay coil 66, since the voltage affects the acceleration, and thus operate/release time of the blades 48 and 54.

It is also within the scope of the present invention to provide a custom designed relay 14 in which the relay design includes parameters such as throw contact blade 48 and 54 travel distance to the pivotal reference terminals 46 and 64, mass of the throw contact blades 48 and 54, number of relay coil 66 windings, magneto-electric properties of an energizing solenoid of relay coil 66, and the like are optimized for a desired operating frequency, since each of the aforementioned properties influences the frequency of operation of DPDT switching relay 14, and thus the AC output frequency, when configured as described in the present invention.

Additional frequency precision is achieved in the LC circuit created by capacitor 22 between center tap 20 and end terminal 24 at the primary 29, as well as the LC circuit created by capacitor 26 between center tap 20 and end terminal 28 at the primary 29. The aforementioned dual LC circuits create a resonant frequency $f=\frac{1}{2\pi}\sqrt{LC}$. Fine tuning the dual LC circuits comprising the transformer inductances, L between end terminal 24 and center tap 20, and between end terminal 28 and center tap 20, as well as capacitances C of capacitor 22 and capacitor 26, so that a resonant frequency is created that is equal to the desired operating frequency will provide greater efficiency and precision of the energizing voltage frequency seen at relay energizing coil 66, and consequently the AC voltage seen at the output terminals is more stable and more efficiently produced. Moreover, since capacitors 22 and 26 act to remove excessive voltage spikes, true AC power in a square wave configuration is provided on the output terminals of transformer 12.

Figure 2:
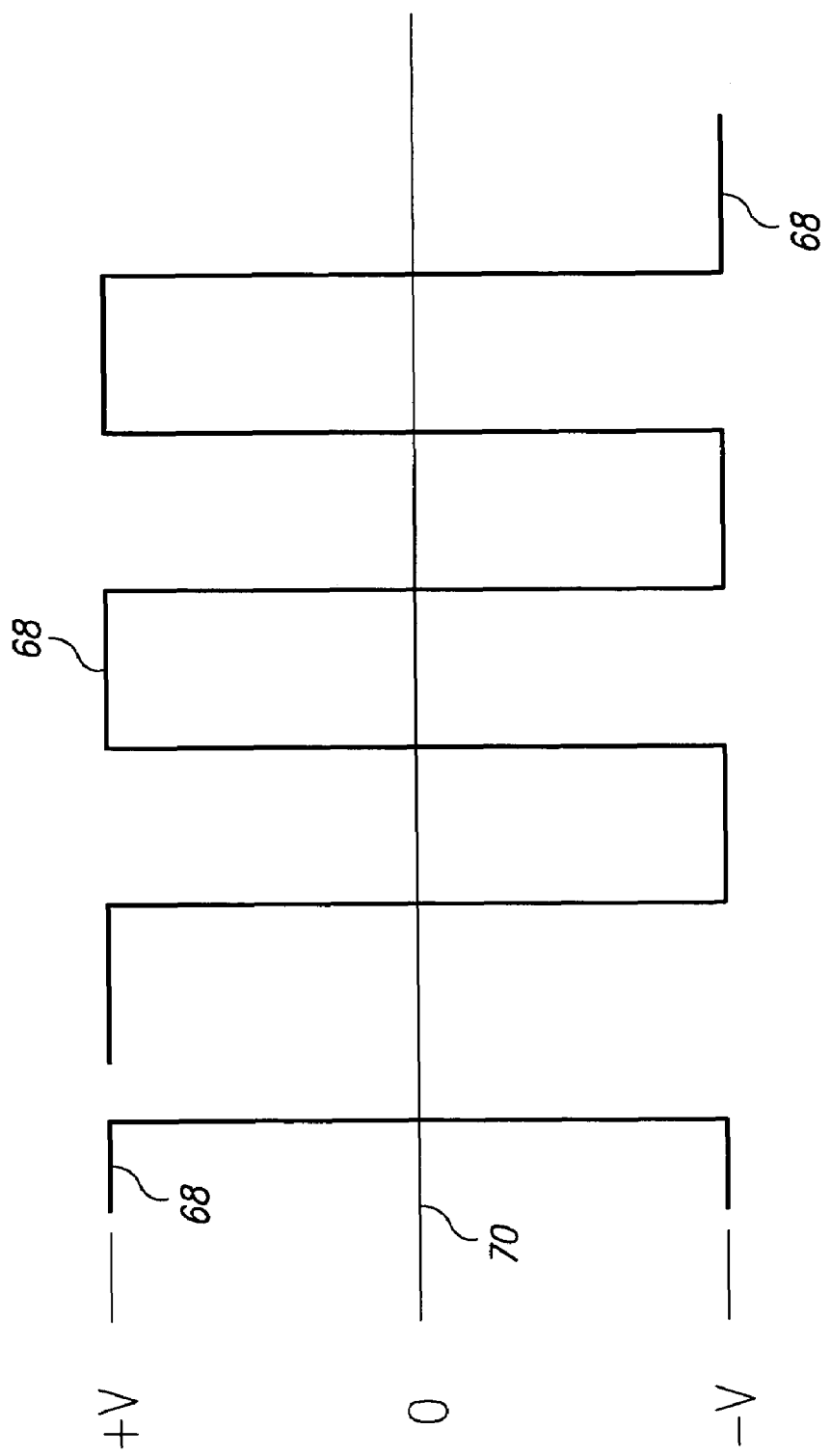
FIG. 2 is a graph of an output voltage wave form of the DC TO AC Power Generator, according to the present invention.

As shown in FIG. 2, the output voltage wave form 68 of the present invention relative to zero reference voltage 70 provides a voltage profile which defines a very precise square wave pattern alternating between approximately equal positive and negative voltage levels over substantially equal time periods. Moreover, the output voltage wave form 68, being unfiltered, has substantially the same wave form as the input wave form at primary 29 created by action of relay switch 14.

Additionally, spare output terminals of transformer 12 may be used to provide supplemental energy to a DC power source such as power source 10 by a simple step—down voltage transformer connection to the spare output terminals, wherein the stepped down voltage may be rectified and used to charge power source 10. This is possible since there are no transformation losses associated with semiconductor controlled rectifiers (SCR's), semiconductor timers, and the like.

According to the present invention, the aforementioned resonant frequency created at primary 29 of transformer 12, in combination with an appropriate selection of the turns ratio between primary 29 and secondary 31 of transformer 12 provides for DC to AC voltage transformations that approach 30:1. For example, utilizing a DC power source 10 of four volts, a 120 volt AC output may be realized during operation of the present invention. Additional power capacity may be realized by connecting more than one DC power source 10 in parallel.

Figure 3:
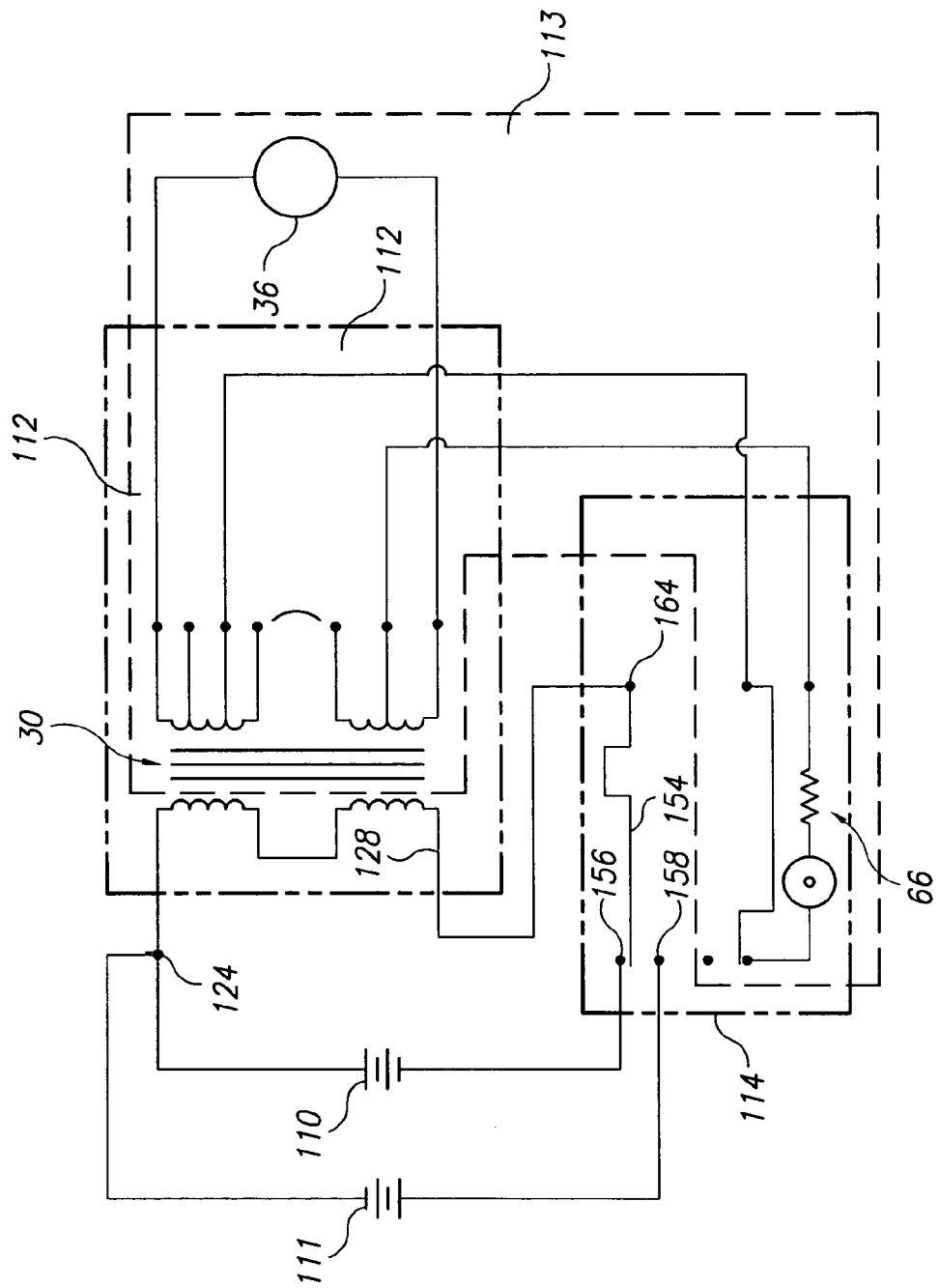
FIG. 3 is an electrical schematic diagram of a second embodiment of the DC TO AC Power Generator, according to the present invention.

According to the second embodiment of the present invention, as shown in FIG. 3, the center tap 20 of primary 29 may be eliminated by configuring two DC power sources, e.g., DC battery supply 110 and DC battery supply 111 so that the positive terminal of battery 110 and the negative terminal of battery 111 are both connected to first primary end terminal 124 of transformer 112. Battery 110 has a negative terminal connected to normally closed gate terminal 156 of relay switch 114, while battery 111 has a positive terminal connected to normally open gate terminal 158 of relay switch 114. Due to the fact that pivotal reference terminal 164, being associated with operative throw contact blade 154, is connected to primary end terminal 128, the aforementioned configuration results in voltage swings at the primary terminals 124 and 128 that are equal and opposite in polarity during operation of relay switch 114.

Figure 4:
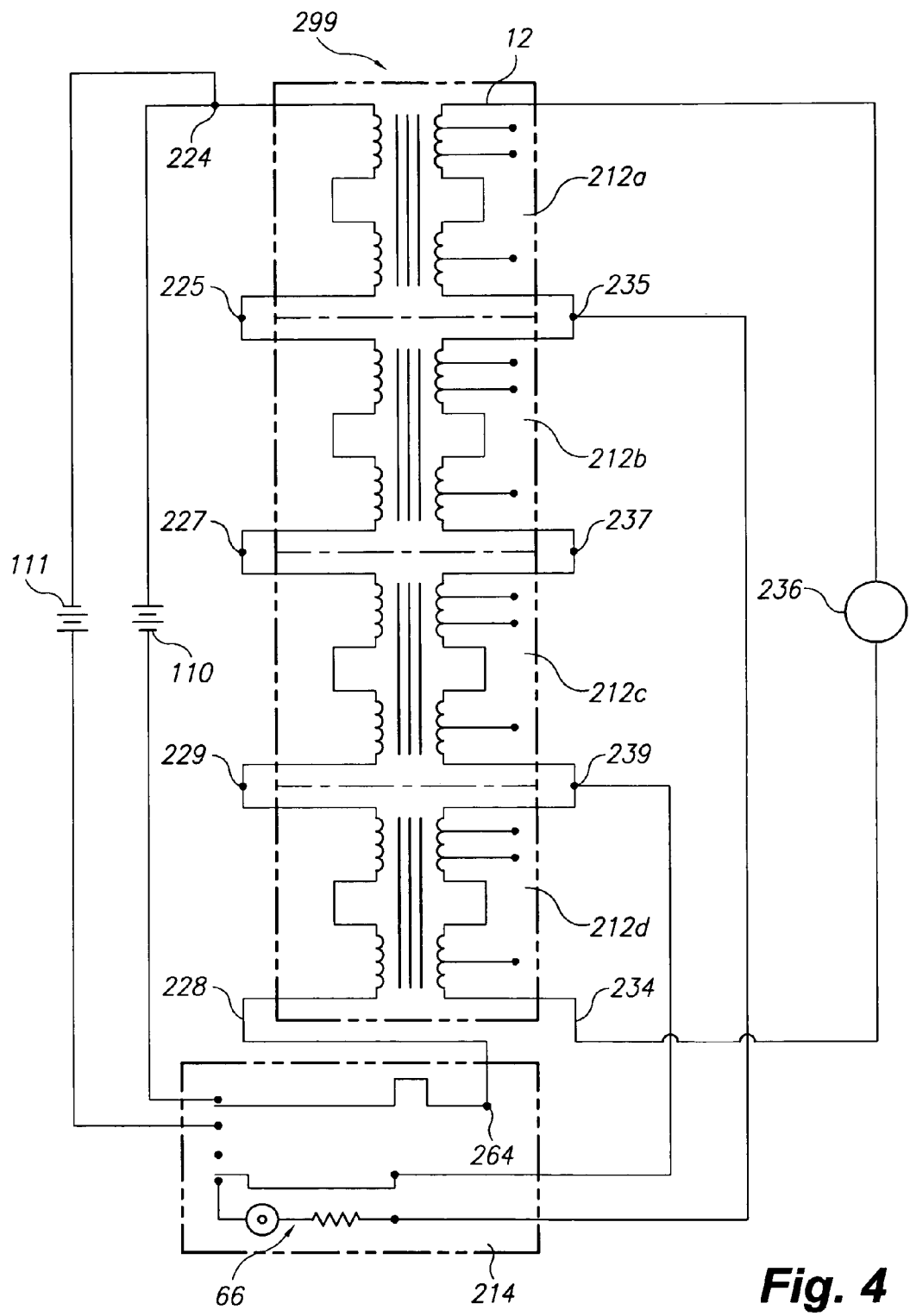
FIG. 4 is an electrical schematic diagram of a third embodiment of the DC TO AC Power Generator, according to the present invention.

According to the third embodiment of the present invention, as shown in FIG. 4, in addition to obviating the necessity for a primary center tap connection, a series ganged transformer group 299 is created. The series ganged transformer group comprises transformers 212a, 212b, 212c, and 212d connected in series with each other. Otherwise, the batteries 110, and 111, and relay switch 214 with relay energizing coil 66 are connected as described in the aforementioned second embodiment of the present invention. The series ganged transformer group 299 provides the capability to supply AC output power satisfying the particular power needs of various loads in a very economical fashion.

From the foregoing description of all the embodiments of the present invention, it will be appreciated that the present invention provides AC power from a DC input without the necessity of rotating alternators, generators, and the like. Additionally, the present invention does not require the use of semiconductor equipment which is vulnerable to extreme environmental conditions such as extreme temperature, radiologic bombardment, and the like. Due to the small number of components, i.e., power source 10, transformer 12, and relay switch 14, the present invention may more reliably operate in a greater variety of environmental conditions, such as, for example, in electric car systems, and at lower cost than equipment using generators or semiconductors.

It is to be understood that the present invention is not limited to the embodiment described above, but encompasses any and all embodiments within the scope of the following claims.

I claim:

1. A dc to ac power generator, comprising:
   a transformer having a primary field winding, a central core, and a secondary field winding;
   a DPDT electromechanical switching relay having associated relay control circuitry;
   an interconnection between the transformer, the DPDT electromechanical switching relay, and associated relay control circuitry of the DPDT electromechanical switching relay;
   a dc power source connected via gate terminals of the switching relay directly to the primary field winding of the transformer;
   a load connected to the secondary field winding of the transformer; and,
   wherein the transformer interconnection to the electromechanical switching relay and associated relay control circuitry creates a reversing polarity input voltage which is stepped up by the transformer to produce an output AC voltage to power the load.

2. The dc to ac power generator according to claim 1, further comprising: the dc power source being connected to a center tap of the transformer primary field winding; a first capacitor being connected between a first end terminal of the transformer primary and the center tap of the transformer primary; and, a second capacitor being connected between a second end terminal of the transformer primary and the center tap of the transformer primary, thereby creating dual LC circuits at the primary of the transformer.

3. The dc to ac power generator according to claim 2, further comprising: the dual LC circuits being tuned to a desired operating frequency, using the parameters $f=1/2\pi\sqrt{LC}$.

4. The dc to ac power generator according to claim 1, further comprising: relay design parameters including throw contact blade travel distance to a pivotal reference terminal, mass of the throw contact blades, number of relay coil windings, and magneto-electric properties of an energizing solenoid of the relay coil being optimized for a desired operating frequency.

5. The dc to ac power generator according to claim 1, wherein the reversing polarity input voltage is a first voltage of a first polarity across a first portion of the transformer primary and then a second voltage of a second polarity across a second portion of the transformer primary.

6. The dc to ac power generator according to claim 5, wherein the first and second voltages are of the same magnitude.

7. The dc to ac power generator according to claim 5, wherein the first and second voltages are alternately provided by the switching relay at substantially equal time intervals.

8. The dc to ac power generator according to claim 7, wherein the output AC voltage has substantially the same wave form as an input waveform created by the first and second voltages.

9. The dc to ac power generator according to claim 1, wherein the transformer further comprises a series ganged transformer group so as to provide power requirements of interconnected electrical loads.

10. The dc to ac power generator according to claim 1, further comprising: the dc source including two dc supplies having opposite polarity terminals connected to a first primary end terminal of the transformer; the remaining dc supply terminals being connected respectively to a normally closed gate terminal of the relay switch and a normally open gate terminal of the relay switch; an associated pivotal reference terminal of the relay switch being connected to a second primary end terminal of the transformer; and, an operative throw contact blade of the relay switch wherein the operative throw contact blade of the relay switch switches polarity of the dc source between the first and the second primary end terminals.

11. A dc to ac power generator, comprising: at least one electrical transformer comprising, in combination: at least one primary winding; at least one secondary winding; at least one magnetic field associated with a magnetic core and positioned so as to interact with the primary and secondary windings such that voltage levels appearing on one of the windings are transformed to different voltage levels on the other of the windings; terminals located on the primary winding and capable of being directly connected to a source of direct current power; terminals located on the secondary winding and capable of being interconnected with electrical equipment so as to permit power flow to and from said electrical equipment; and, at least one electromechanical relay switch connected to the transformer and capable of being connected to a source of direct current power for switching polarity of direct current power which may be provided from the source of direct current power to the transformer primary winding such that alternating current power is provided on the transformer secondary winding.

12. The dc to ac power generator according to claim 11, further comprising: the electromechanical relay switch having the capability of alternately providing a first voltage of a first polarity across a first portion of the transformer secondary winding and then a second voltage of a second polarity across a second portion of the transformer secondary winding.

13. The dc to ac power generator according to claim 12, further comprising at least one source of direct current power.

14. The dc to ac power generator according to claim 13, wherein the source of direct current power is connected to a terminal on the central portion of the transformer primary winding and to the relay switch, such that operation of the relay switch causes alternating connection of the source of direct current power between a first configuration of a first polarity across a first portion of the transformer primary winding, and a second configuration, of opposite polarity to the first configuration, across a second portion of the transformer primary winding.

15. The dc to ac power generator according to claim 14, wherein the source of direct current power comprises a single direct current battery.

16. A method for generating alternating current power, the method comprising the steps of:
   connecting the primary field winding of an electrical transformer directly to at least one direct current power source;
   connecting a DPDT relay switch to the transformer and to the direct current power source;

transforming the voltage level received by the transformer from the direct current power source such that a first voltage level is transformed to a second voltage level;

operating the relay switch so as to repeatedly reverse polarity of voltage transmitted to the transformer from the direct current power source; and providing an output signal corresponding to the second voltage level and having a polarity corresponding to that of the voltage transmitted to the transformer from the direct current power source, the output signal being alternating current power.

17. The method for generating alternating current power according to claim 16, wherein the step of operating the relay switch further comprises the step of alternately providing a first voltage of a first polarity across a first portion of the transformer and then providing a second voltage of a second polarity across a second portion of the transformer.

18. The method for generating alternating current power according to claim 17, wherein the step of operating the relay switch further comprises the step of alternately providing the first and second voltage levels at substantially equal time intervals.

19. The method for generating alternating current power according to claim 16, wherein the step of connecting the transformer comprises the step of connecting the direct current power source to a plurality of electrical transformers in series configuration so as to provide power requirements of interconnected electrical loads.

* * * * *